US009328703B2

(12) United States Patent
Shimozato et al.

(10) Patent No.: US 9,328,703 B2
(45) Date of Patent: May 3, 2016

(54) AIR INTAKE SYSTEM OF SADDLE-RIDE TYPE VEHICLE

(71) Applicant: HONDA MOTOR CO., LTD., Tokyo (JP)

(72) Inventors: Noriya Shimozato, Wako (JP); Katsuhiro Kunikiyo, Wako (JP); Yuki Mizukura, Wako (JP); Takashi Sasaki, Wako (JP); Yosuke Matsuoka, Wako (JP); Masashi Saito, Wako (JP); Jun Tanaka, Wako (JP); Yoshiaki Noda, Wako (JP); Toshitaka Akita, Wako (JP); Naoki Serizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 14/511,000

(22) Filed: Oct. 9, 2014

(65) Prior Publication Data

US 2015/0101558 A1 Apr. 16, 2015

(30) Foreign Application Priority Data

Oct. 11, 2013 (JP) ................................ 2013-214062

(51) Int. Cl.

| | |
|---|---|
| ***B60K 11/00*** | (2006.01) |
| ***F02M 35/16*** | (2006.01) |
| ***F02M 35/02*** | (2006.01) |
| ***F02M 35/024*** | (2006.01) |
| ***F02M 35/10*** | (2006.01) |
| ***F02M 35/08*** | (2006.01) |

(52) U.S. Cl.

CPC ......... *F02M 35/162* (2013.01); *F02M 35/0201* (2013.01); *F02M 35/02483* (2013.01); *F02M 35/082* (2013.01); *F02M 35/10013* (2013.01)

(58) Field of Classification Search

CPC .................... F02M 35/10014; F02M 35/0204; F02M 35/162; F02M 35/0201; F02M 25/02482; F02M 35/082

USPC .................................................... 123/184.21

See application file for complete search history.

(56) References Cited

U.S. PATENT DOCUMENTS

| | | | | |
|---|---|---|---|---|
| 4,611,679 | A * | 9/1986 | Yanagishita et al. | 180/68.3 |
| 2007/0028884 | A1* | 2/2007 | Atsumi | 123/184.53 |
| 2007/0144802 | A1* | 6/2007 | Tsuya | 180/68.2 |
| 2010/0071991 | A1* | 3/2010 | Ono | 181/229 |
| 2012/0192839 | A1* | 8/2012 | Arima et al. | 123/559.1 |
| 2014/0092613 | A1* | 4/2014 | Maeda et al. | 362/476 |

FOREIGN PATENT DOCUMENTS

JP 3723792 B2 4/2004

* cited by examiner

*Primary Examiner* — Marguerite McMahon

(74) *Attorney, Agent, or Firm* — Birch, Stewart, Kolasch & Birch, LLP

(57) ABSTRACT

An air intake system for a saddle-ride vehicle for facilitating the intake of fresh air and for enabling a discharge of excess pressure in an air cleaner box. The system includes an air cleaner box with an air cleaner element housed in an air cleaner case and an intake duct connected to the air cleaner box with an intake port open toward a vehicle front side, in which the intake duct has a duct opening oriented outward of the duct between the intake port and the air cleaner box. The air cleaner box includes parts for connecting the intake duct, a connecting tube and also case openings oriented outward of the case.

20 Claims, 5 Drawing Sheets

AIR INTAKE SYSTEM OF SADDLE-RIDE TYPE VEHICLE

CROSS-REFERENCE TO RELATED APPLICATIONS

The present application claims priority under 35 USC 119 to Japanese Patent Application No. 2013-214062 filed Oct. 11, 2013 the entire contents of which are hereby incorporated by reference.

BACKGROUND OF THE INVENTION

1. Field of the Invention

The present invention relates to an air intake system of a saddle-ride type vehicle.

2. Description of Background Art

Some conventional air intake systems of saddle-ride type vehicles have an intake duct in which an intake port is open toward a vehicle front side. See, for example, Japanese Patent No. 3723792.

In Japanese Patent No. 3723792, although fresh air is easily taken into an air cleaner box, the pressure in the air cleaner box tends to be always high due to the ram pressure applied to the inside of the air cleaner box. In this condition, delicate throttle operation may cause intake pulsation in the air cleaner box and affect throttle response.

SUMMARY AND OBJECTS OF THE INVENTION

It is an object of an embodiment of the present invention to provide an air intake system of a saddle-ride type vehicle for easily introducing fresh air and for discharging excess pressure in an air cleaner box.

According to an embodiment of the present invention, an air intake system of a saddle-ride type vehicle includes an air cleaner box (40) with an air cleaner element (45) housed in an air cleaner case (41) and an intake duct (50) connected to the air cleaner box (40) with an intake port (51) open toward a vehicle front side, the intake duct (50) has a duct opening (54) oriented outward of the duct between the intake port (51) and the air cleaner box (40) and the air cleaner box (40) includes parts for connecting the intake duct (50) and a connecting tube (26) and also case openings (57, 58) oriented outward of the case.

The above saddle-ride type vehicle includes all vehicles designed so that a rider straddles the vehicle body to ride and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles.

According to an embodiment of the present invention, the duct opening (54) is shaped like a louver with a guide plate (55) inclined inward of the duct that is oriented perpendicularly to a flow of an air flow along the guide plate (55).

According to an embodiment of the present invention, the intake duct (50) is connected to an upper or lower portion of the air cleaner box (40) and the case openings (57, 58) of the air cleaner box (40) are located in an upper or lower portion of the air cleaner box (40) according to a place where the intake duct (50) is connected.

According to an embodiment of the present invention, the case openings (57, 58) of the air cleaner box (40) are made in left and right side walls (42*b*) and a rear wall (42*c*) of the air cleaner box (40) and the case openings (57) in the left and right side walls (42*b*) are located in a position biased toward a rear side of the air cleaner box (40).

According to an embodiment of the present invention, the air cleaner box (40) is located under a seat (33), the intake duct (50) is located over the fuel tank (31) in front of the seat (33), the intake port (51) is located behind a head pipe (6), and the duct opening (54) is located closer to a front end (33*a*) of the seat (33) than the intake port (51).

According to an embodiment of the present invention, a front wall portion of the air cleaner box (40) serves as a front case opening (56).

According to an embodiment of the present invention, the case openings (57, 58) in the left and right side walls (42*b*) and the rear wall (42*c*) of the air cleaner box (40) have ribs (57*a*, 58*a*) erected from rims respectively.

According to an embodiment of the present invention, the intake port is open toward a vehicle front side to produce a cooling air intake effect and a proper ram pressure effect and at the same time the excess pressure in the air cleaner box can be discharged out of the case through the case openings so that the pressure in the air cleaner box is stabilized and the required amount of air can be introduced due to the duct openings.

According to an embodiment of the present invention, the flow of air can be efficiently introduced into the duct along the guide plate with the wind pressure suppressed and the air flow in the duct can be rectified to introduce air efficiently.

According to an embodiment of the present invention, the ram pressure can be easily removed using the inertia of the flow of air introduced into the air cleaner box through the intake duct.

According to an embodiment of the present invention, due to the presence of the case openings in the rear side of the left and right side walls and rear wall, excess pressure can be effectively discharged because the air introduced through the intake duct moves toward the rear side of the air cleaner box by inertia.

According to an embodiment of the present invention, the head pipe suppresses the penetration of dust, etc. through the intake port and the duct opening located between the rider's left and right knees suppresses the penetration of dust etc. through the duct openings.

According to an embodiment of the present invention, after the flow of air introduced into the air cleaner box through the intake duct moves to the case front side, it smoothly moves out of the case, so pressure rise is suppressed and all the area around the element gets into a rich condition, leading to an improvement in throttle response as well as improvement in intake efficiency.

According to an embodiment of the present invention, the rigidity of the air cleaner box is ensured and at the same time the ribs function as ducts to improve the capability of discharging excess pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
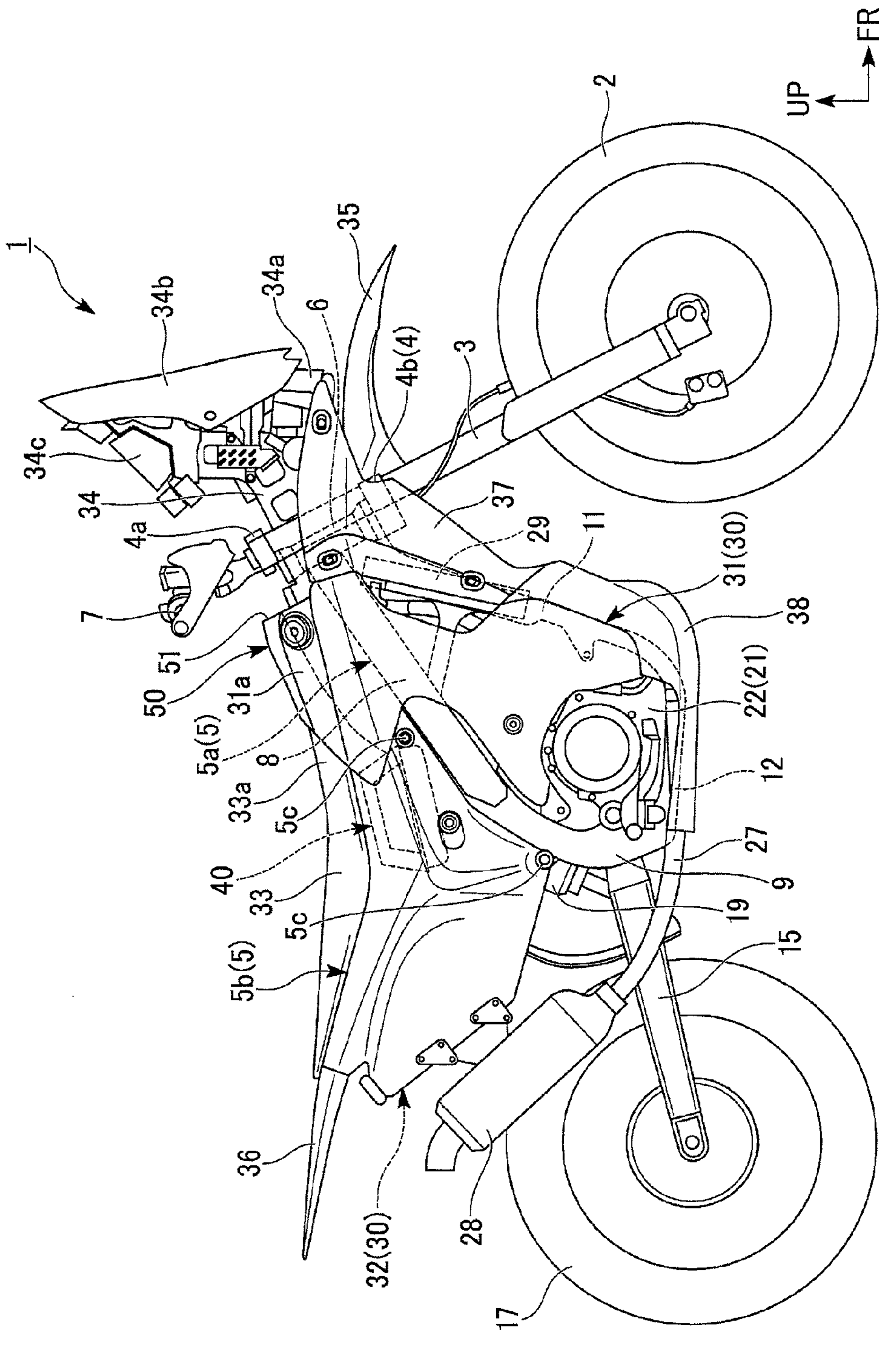
FIG. 1 is a right side view of a motorcycle in an embodiment of the present invention.

An embodiment of the present invention will be described referring to drawings. The directions such as front, rear, left and right in the explanation below are the same as the directions of the vehicle described below unless otherwise specified. In the drawings used in the explanation below, an arrow FR indicates a forward direction of the vehicle, an arrow LH indicates a left direction of the vehicle, and an arrow UP indicates an upward direction of the vehicle in appropriate places.

In an off-road type motorcycle 1 shown in FIG. 1, its front wheel 2 is journaled to the lower ends of left and right front forks 3. The upper portions of the left and right front forks 3 are pivotally supported by a head pipe 6 of a body frame 5 steerably through a steering stem 4. A steering handlebar 7 is attached onto a top bridge 4*a* of the steering stem 4.

The body frame 5 has a solid front frame 5*a*, for example, made of aluminum alloy and a solid rear frame 5*b*, for example, made of resin. The rear frame 5*b* functions as a seat frame and its front is coupled to the rear of the front frame 5*a* by a plurality of fastening parts 5*c*.

The front frame 5*a* has a head pipe 6, left and right main tubes 8 extending downwardly and rearwardly from the head pipe 6, left and right pivot frames 9 for connecting the rear ends of the left and right main tubes 8, a single down frame 11 extending downwardly and rearwardly from the head pipe 6 more steeply than the left and right main tubes 8, and left and right lower frames 12 branching leftward and rightward from the lower end of the down frame 11, curving rearwardly and being connected to the lower ends of the left and right pivot frames 9.

The front end of a swing arm 15 is journaled to the left and right pivot frames 9 in a vertically swingable manner. The rear wheel 17 of the motorcycle 1 is journaled to the rear end of the swing arm 15. The lower end of a rear cushion unit 19 is coupled to the front bottom of the swing arm 15 through a link mechanism (not shown). The upper end of the rear shock absorber 19 is coupled to a cross member (not shown) extending across between the rear ends of the left and right main tubes 8.

Figure 2:
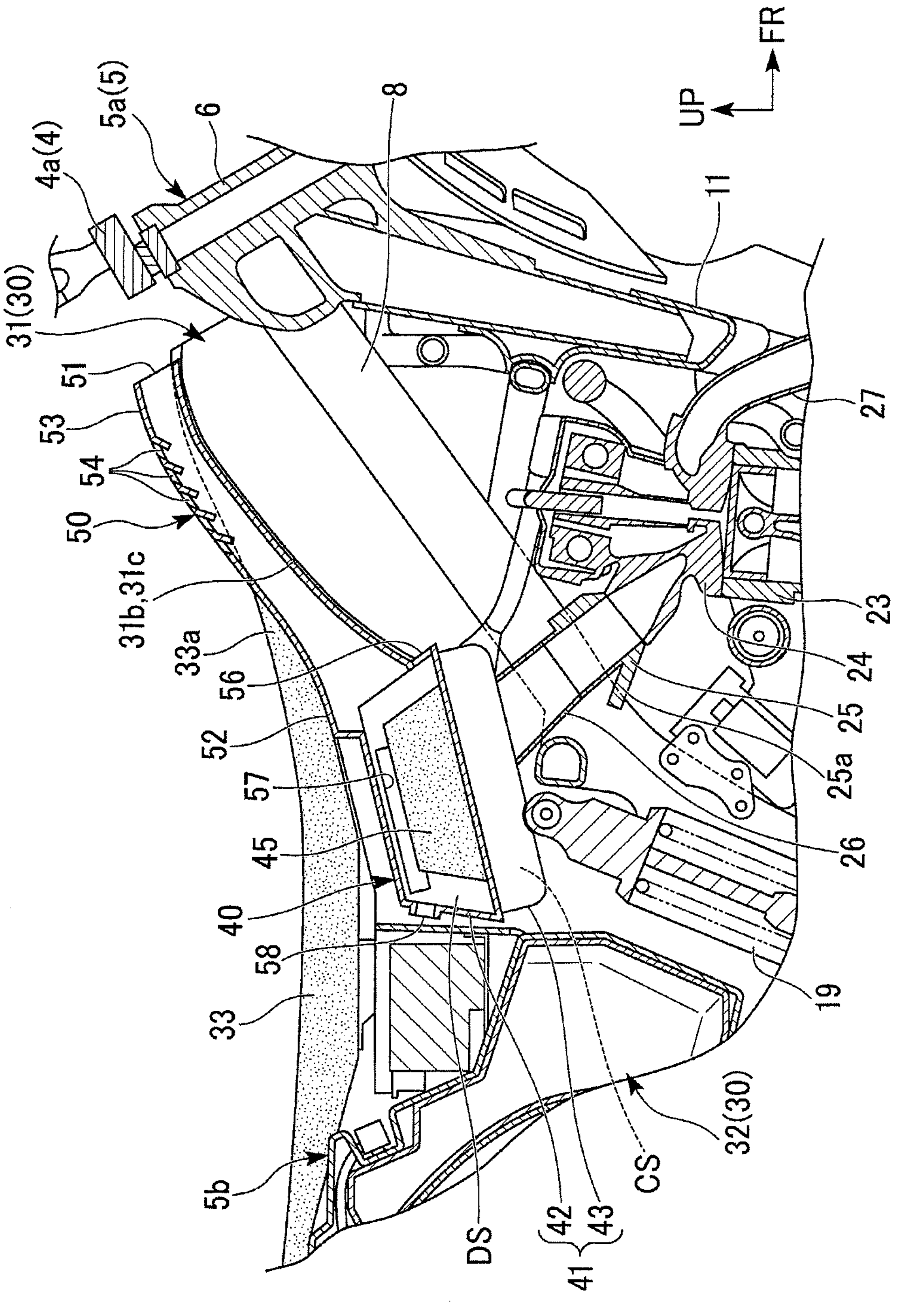
FIG. 2 is a sectional view of an essential part of the motorcycle at the transverse center of the vehicle body.

Referring to FIG. 2, an internal combustion engine 21 for the motorcycle 1 is mounted inside the front frame 5*a*. The engine 21 is a water-cooled single-cylinder engine with a crankshaft parallel to the vehicle width direction (transverse direction), in which a cylinder 23 is almost vertically erected on the front upper portion of a crankcase 22 constituting the lower portion of the engine. A cylinder head 24 is fixed on the cylinder 23. The rear of the crankcase 22 also serves as a transmission case. An output shaft of the transmission protrudes from the rear left side of the crankcase 22 and the output shaft and the rear wheel 17 are linked to each other by a chain type transmission mechanism (they are not shown).

An engine air intake system is connected to the rear of the cylinder head 24 and an engine exhaust system is connected to the front of the cylinder head 24.

In the figures, a throttle body 25 is connected to an intake port open toward the upper rear side of the cylinder head 24, an injector 25*a* is attached to the throttle body 25, and an air cleaner box 40 is connected, through a connecting tube 26, to an upstream end which is open toward the upper rear side of the throttle body 25.

Also, in the figures, an exhaust pipe 27 is connected to an exhaust port open toward the front side of the cylinder head 24 and extends downwardly from forward of the engine 21 and on the rear right side of the vehicle body and a muffler 28 is located on the rear right side of the vehicle body and connected to the downstream end of the exhaust pipe 27.

A front stay 34 protruding forward is fixed to the front of the head pipe 6. A headlight 34*a*, a wind screen 34*b*, and meters 34*c* are supported on the front stay 34.

Figure 3:
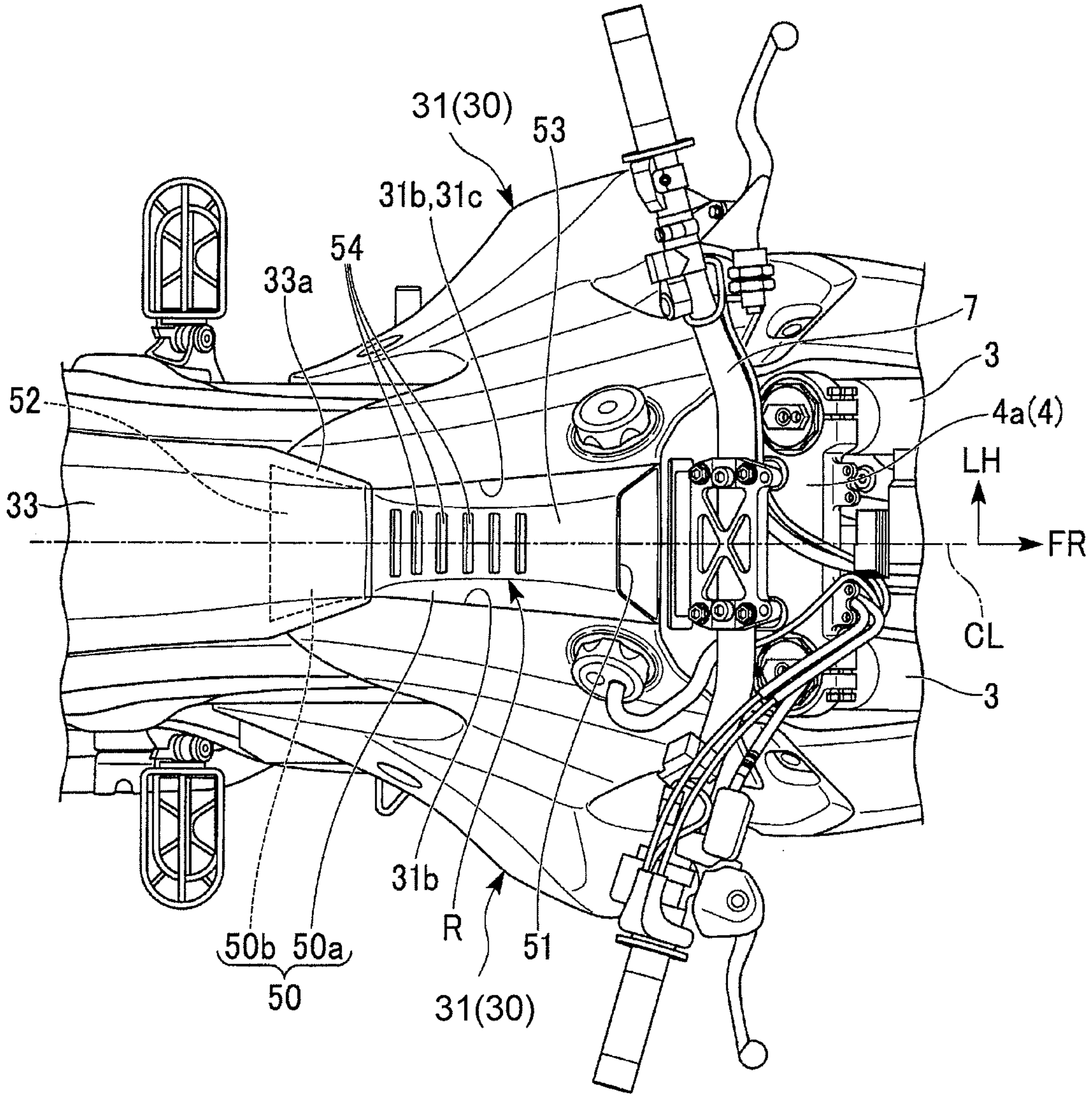
FIG. 3 is a top view of an essential part of the motorcycle.

Referring to FIG. 3 as well, the motorcycle 1 has a pair of left and right front tanks 30 located on the left and right of the vehicle body as fuel tanks 30 for the engine 21 and a rear tank 32 located inside the rear frame 5*b*. In a side view, the left and right front tanks 31 vertically extend across the left and right main tubes 8 so that their lower portions cover the lateral sides of the engine 21. In FIG. 3, line CL denotes a centerline in the transverse direction of the vehicle body.

A seat 33 for an occupant to sit on is supported on the rear frame 5*b*. The front end 33*a* of the seat 33 is located so as to cover the space between the rear sides of the upper ends 31*a* of the left and right front tanks 31 from above.

Stepped parts 31*b* having an L-shaped cross section and extending longitudinally are formed inside the upper ends 31*a* of the left and right front tanks 31 in the vehicle width direction. The left and right stepped parts 31*b* are adjacent to each other, forming a groove 31*c* having a U-shaped cross section and extending longitudinally at the transverse center of the vehicle body. In the groove 31*c*, an intake duct 50 having a rectangular cross section and extending longitudinally is located in an aligning manner.

In FIG. 1, a front fender 35 is supported by a bottom bridge 4*b* of a steering stem 4, a rear fender 36 extends rearwardly of the seat 33, a pair of left and right radiators 29 is located on both the left and right sides of the down frame 11, and left and right shrouds 37 are located in front of the left and right front tanks 31, covering the lateral sides of the left and right radiators 29, and an undercover 38 covers the lower front side of the engine 21.

Figure 4:
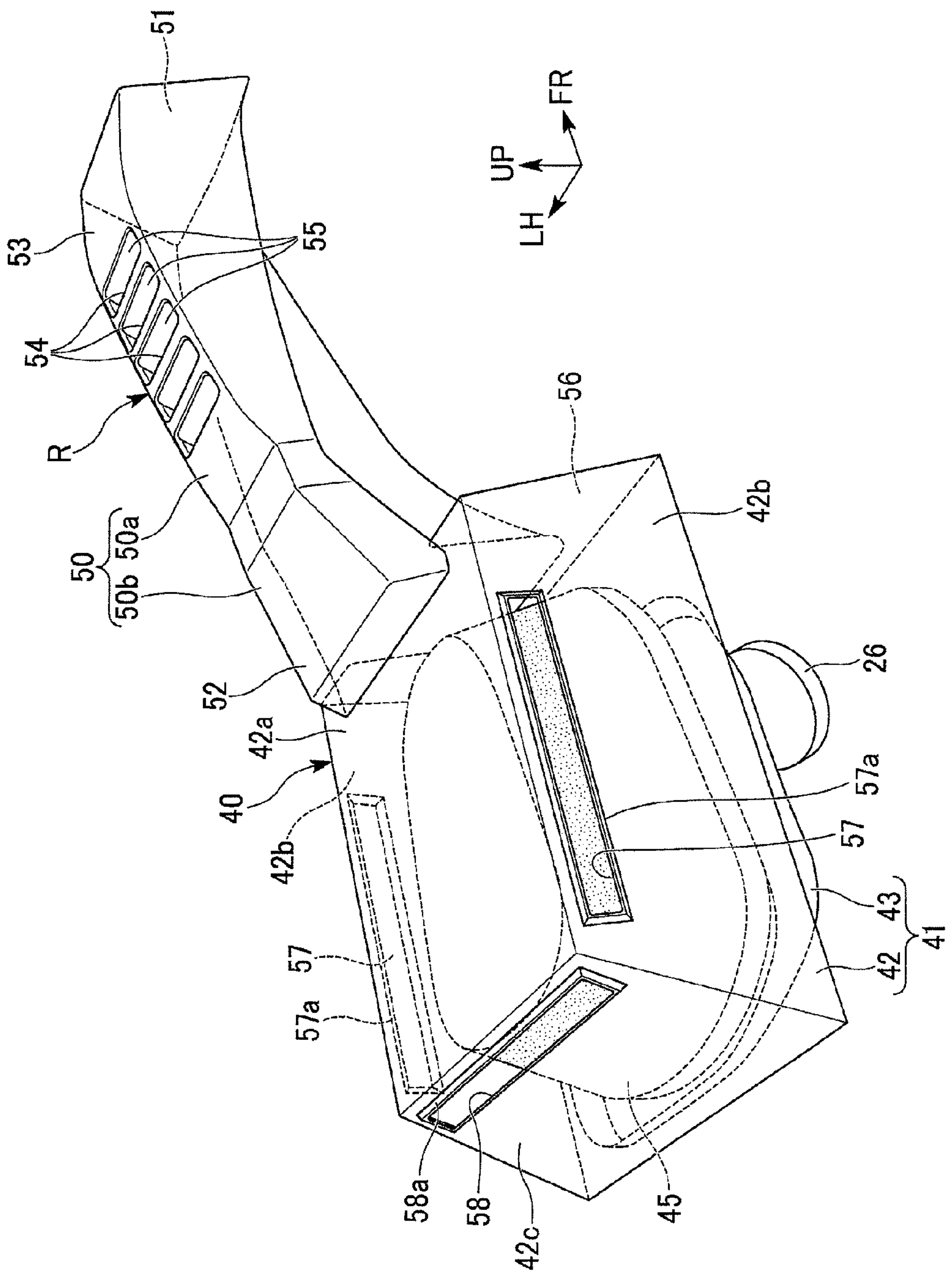
FIG. 4 is a perspective view of an air cleaner body and an intake duct in the motorcycle.

Referring to FIGS. 2 and 4, in the air cleaner box 40, an air cleaner element 45 is housed in an air cleaner case 41. The air cleaner case 41 is divided into an upper case body 42 as its upper part and a lower case body 43 as its lower part. The periphery of an element holder (not shown) is held on the plane of division between the upper and lower case bodies 42 and 43. The air cleaner element 45, made of urethane sponge and in the form of a container with a downward opening, is supported above the element holder.

The space inside the air cleaner case 41 is partitioned into a dirty side DS on the upper case body 42 side and a clean side CS on the lower case body 43 side by the air cleaner element 45 and element holder. The external air introduced into the dirty side DS of the air cleaner case 41 passes from outside of the air cleaner element 45 into its inside and after it gets filtrated and arrives at the clean side CS, it passes through the throttle body 25, etc. before being introduced into the cylinder 23.

The air cleaner box 40 is located under the front portion of the seat 33 and behind the upper portions of the left and right front tanks 31. The rear end 52 of the intake duct 50 which enables air to be introduced into the dirty side DS is connected to the front end of the upper case body 42 of the air cleaner box 40.

Referring to FIG. 3, the intake duct 50 extends between the upper ends 31*a* of the left and right front tanks 31 along the transverse center of the vehicle body, in which the intake port 51 as its front end opening is open toward a forward direction at a prescribed distance from the top bridge 4*a*. The intake duct 50 produces a cooling air intake effect on the air cleaner box 40 and also produces a ram air effect due to a flow of air pressure during a flow at a high speed.

The intake duct 50 is exposed outward of the vehicle in front of the seat 33 and between the upper ends 31*a* of the left and right front tanks 31. The intake duct 50 is located so that its more forward portion more protrudes above the upper ends 31*a* of the left and right front tanks 31 in a side view. Accordingly the stepped parts 31*b* of the upper ends 31*a* of the left and right front tanks 31 are shaped so that their front portions are shallower. The upper portions of the left and right front tanks 31 form the regions to be sandwiched between the knees of the rider (regions to be knee-gripped) and the intake duct 50 is located between the regions. The rear end 52 of the intake duct 50 is supported with its upper portion lying on the upper wall 42*a* of the upper case body 42.

Figure 5:
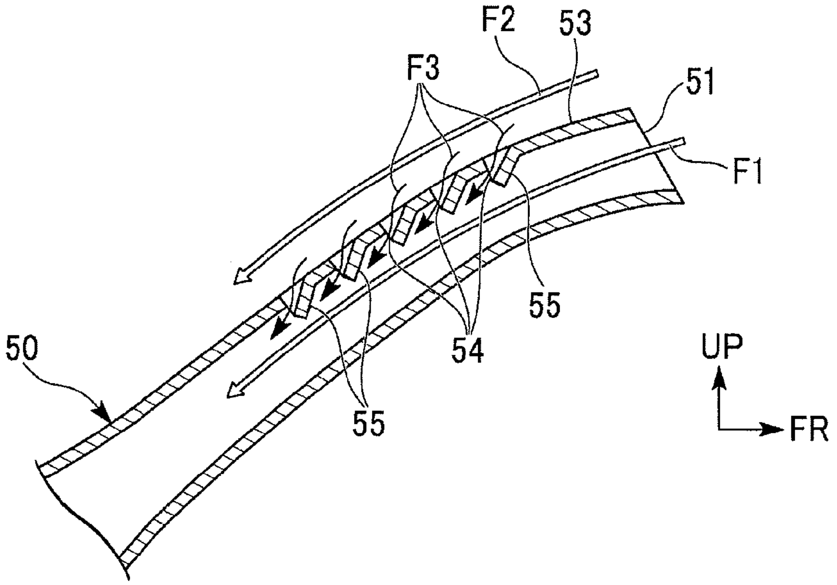
FIG. 5 is a sectional view of the intake duct at the transverse center of the vehicle body.

Referring to FIGS. 4 and 5, a plurality of slit-shaped duct openings 54 extending in the vehicle width direction are formed in the upper wall 53 of the intake duct 50 longitudinally in a row. The duct openings 54 each have a guide plate 55, in which a duct opening 54 in a more rearwardly position has a guide plate more inclined toward the duct inside with respect to the upper wall 53 of the intake duct 50. The guide plates 55 cause some flow of air flowing rearwardly along the upper wall 53 of the intake duct 50 (this flow is indicated by arrow F2 in FIG. 5) to curve along the guide plates 55 and be guided into the duct through the corresponding duct openings 54 (this flow is indicated by arrow F3 in FIG. 5). The duct openings 54 are oriented upwardly and forwardly, perpendicularly to this flow of air flow (in other words, perpendicularly to the guide plates 55). The guide plates 55 are located in a region R where the plural duct openings 54 are formed like a louver. In FIG. 5, arrow F1 indicates the flow of flow of air inside the intake duct 50.

Referring to FIGS. 3 and 4, the intake duct 50 is so shaped that the transverse width of the flow path gradually decreases in the portion from the intake port 51 to a point rearwardly of the longitudinal center (a point near the rear end of the region R) and in the more rearward portion, the transverse width of the flow path gradually increases. Hereinafter the portion in which the transverse width of the flow path gradually decreases will be called the reduced portion 50*a* and the portion in which the transverse width of the flow path gradually increases will be called the enlarged portion 50*b*.

While the flow of air introduced into the intake duct 50 through the intake port 51 passes through the reduced portion 50*a*, its flow velocity gradually increases and accelerates the introduction of air through the duct openings 54.

Here the front wall of the upper case body 42 is removed in order to make the dirty side DS open forward. Consequently a front case opening 56 is formed in place of the front wall of the upper case body 42. The lower opening of the rear end 52 of the intake duct 50 is located in front of and opposite to the upper and transversely inner side of the front case opening 56. The flow of air passing through the intake duct 50 is dispersed as appropriate while it passes through the enlarged portion 50*b* and as it enters the air cleaner case 41 from the front case opening 56, it is further dispersed and supplied to the area around the air cleaner element 45.

Left and right case openings 57 are formed in left and right side walls 42*b* of the upper case body 42 near their upper ends. The left and right case openings 57 have the shape of a longitudinally long rectangle and are located in a position biased toward the rear side of the upper case body 42. A ram pressure is generated in the air cleaner box 40 due to a flow of air from the intake duct 50 and it is desirable to suppress the influence of this ram pressure on throttle response.

For this reason, taking the inertia of the flow of air into consideration, the left and right case openings 57 are located in the upper portion of the upper case body 42 in a position biased rearwardly so that some of the flow of air introduced into the air cleaner box 40 through the intake duct 50 can be discharged efficiently. Consequently, the excess pressure in the air cleaner box 40 can be discharged efficiently.

A rear case opening 58 is formed in the rear wall 42*c* of the upper case body 42 near its upper end. The rear case opening 58 has the shape of a transversely long rectangle and is located symmetrically. This rear case opening 58 also enables the excess pressure to be discharged efficiently.

The case openings 57 and 58 are located in a position biased toward the upper portion of the air cleaner box 40 according to the place where the intake duct 50 is connected to the air cleaner box 40. However, if the intake duct 50 is connected to the lower portion of the air cleaner box 40, the case openings 57 and 58 will be located in a position biased toward the lower portion of the air cleaner box 40.

In addition, left and right ribs 57*a* erected outward of the case are formed on the rims of the left and right case openings 57 all around them and a rear rib 58*a* erected outward of the case is formed on the rim of the rear case opening 58. Consequently, the rigidity of the upper portion of the upper case body 42 is ensured and the ribs 57*a* and 58*b* function as ducts, thereby improving the capability of discharging excess pressure.

Also, by forming the plurality of duct openings 54 in the upper wall 53 of the intake duct 50 and enabling air to be introduced through these duct openings 54, the required amount of air is introduced while the flow of air pressure is kept low.

As explained above, the air intake system of the saddle-ride type vehicle in the above embodiment includes the air cleaner box 40 with the air cleaner element 45 housed in the air cleaner case 41, and the intake duct 50 connected to the air cleaner box 40 with the intake port 51 open toward a vehicle front side, in which the intake duct 50 has the intake port 51 and duct openings 54 oriented outwardly of the duct, and the air cleaner box 40 includes parts for connecting the intake duct 50 and the connecting tube 26 and also case openings 57 and 58 oriented outward of the case.

According to this structure, the intake port 51 is open toward the vehicle front side to produce a cooling air intake effect and a proper ram pressure effect and at the same time the excess pressure in the air cleaner box 40 can be discharged out of the case through the case openings 57 and 58 so that the pressure in the air cleaner box 40 can be stabilized and the required amount of air can be introduced due to the duct openings 54.

Furthermore, in the air intake system of the saddle-ride type vehicle, since the duct openings 54 are shaped like a louver with a guide plate 55 inclined toward the duct inside and open perpendicularly to the flow of flow of air along the guide plate 55, the flow of air can be efficiently introduced into the duct along the guide plate with the air pressure suppressed and the air flow in the duct can be rectified to introduce air efficiently.

In the air intake system of the above saddle-ride type vehicle, since the intake duct 50 is connected to the upper or lower portion of the air cleaner box 40 and the case openings 57 and 58 of the air cleaner box 40 are located in the upper or lower portion of the air cleaner box 40 according to the place where the intake duct 50 is connected, the ram pressure can be easily removed using the inertia of the flow of air introduced into the air cleaner box 40 through the intake duct 50.

Also, in the air intake system of the saddle-ride type vehicle, the case openings 57 and 58 of the air cleaner box 40 are made in the left and right side walls 42*b* and the rear wall 42*c* of the air cleaner box 40 and the case openings 57 in the left and right side walls 42*b* are located in a position biased toward the rear side of the air cleaner box 40, so due to the presence of the case openings 57 and 58 in the rear side of the left and right side walls 42*b* and rear wall 42*c*, the excess pressure can be effectively discharged because the flow of air introduced through the intake duct 50 moves to the rear side of the air cleaner box 40 by inertia. In addition, during operation at a low speed, air can be introduced not only from ahead of the air cleaner box 40 but also from behind the air cleaner box 40, so air can be introduced efficiently.

Also, in the air intake system of the saddle-ride type vehicle, the air cleaner box 40 is located under the seat 33, the intake duct 50 is located over the front tanks 31 in front of the seat 33, the intake port 51 is located behind the head pipe 6 and the duct openings 54 are located closer to the front end 33*a* of the seat 33 than the intake port 51, so the head pipe 6 suppresses the penetration of dust, etc. through the intake port 51 and the duct openings 54 located between the rider's left and right knees suppress the penetration of dust etc. through the duct openings 54.

Also, in the air intake system of the saddle-ride type vehicle, since the front wall portion of the air cleaner box 40 serves as the front case opening 56, after the flow of air introduced into the air cleaner box 40 through the intake duct 50 moves to the case front side, it smoothly moves out of the case and pressure rise is thus suppressed and all the area around the element gets into a rich condition, leading to improvement in throttle response as well as improvement in intake efficiency.

Also, in the air intake system of the saddle-ride type vehicle, since the case openings 57 and 58 in the left and right side walls 42*b* and the rear wall 42*c* of the air cleaner box 40 have ribs 57*a* and 58*a* erected from the rims respectively, the rigidity of the air cleaner box 40 is ensured and at the same time the ribs 57*a* and 58*b* function as ducts to improve the capability of discharging excess pressure.

The present invention is not limited to the above embodiment.

The saddle-ride type vehicle includes all vehicles designed so that a rider straddles the vehicle body to ride and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles.

The structure of the above embodiment is one example of the present invention and it may be modified in various ways without departing from the gist of the present invention, for example, by replacing constituent elements of the embodiment by known constituent elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake system for a saddle-ride vehicle comprising:

an air cleaner box with an air cleaner element housed in an air cleaner case;

an intake duct connected to the air cleaner box with an intake port open toward a vehicle front side;

a duct opening formed in said intake duct, said duct opening being oriented outward of the duct between the intake port and the air cleaner box; and a connecting tube operatively connected to the air cleaner box, said air cleaner box includes case openings oriented outward of the case.

2. The air intake system for the saddle-ride vehicle according to claim 1, wherein the duct opening is louver shaped with a guide plate inclined inward of the intake duct and is oriented perpendicularly to a flow of flow of air along the guide plate.

3. The air intake system for the saddle-ride vehicle according to claim 1, wherein the intake duct is connected to an upper or lower portion of the air cleaner box and the case openings of the air cleaner box are located in an upper or lower portion of the air cleaner box according to a place where the intake duct is connected.

4. The air intake system for the saddle-ride vehicle according to claim 2, wherein the intake duct is connected to an upper or lower portion of the air cleaner box and the case openings of the air cleaner box are located in an upper or lower portion of the air cleaner box according to a place where the intake duct is connected.

5. The air intake system for the saddle-ride vehicle according to claim 1, wherein the case openings of the air cleaner box are made in left and right side walls and a rear wall of the air cleaner box and the case openings in the left and right side walls are located in a position biased toward a rear side of the air cleaner box.

6. The air intake system for the saddle-ride vehicle according to claim 2, wherein the case openings of the air cleaner box are made in left and right side walls and a rear wall of the air cleaner box and the case openings in the left and right side walls are located in a position biased toward a rear side of the air cleaner box.

7. The air intake system for the saddle-ride vehicle according to claim 3, wherein the case openings of the air cleaner box are made in left and right side walls and a rear wall of the air cleaner box and the case openings in the left and right side walls are located in a position biased toward a rear side of the air cleaner box.

8. The air intake system for the saddle-ride vehicle according to claim 1, wherein the air cleaner box is located under a seat, the intake duct is located over the fuel tank in front of the seat, the intake port is located behind a head pipe, and the duct opening is located closer to a front end of the seat than the intake port.

9. The air intake system for the saddle-ride vehicle according to claim 2, wherein the air cleaner box is located under a seat, the intake duct is located over the fuel tank in front of the seat, the intake port is located behind a head pipe, and the duct opening is located closer to a front end of the seat than the intake port.

10. The air intake system for the saddle-ride vehicle according to claim 3, wherein the air cleaner box is located under a seat, the intake duct is located over the fuel tank in front of the seat, the intake port is located behind a head pipe, and the duct opening is located closer to a front end of the seat than the intake port.

11. The air intake system for the saddle-ride vehicle according to claim 5, wherein the air cleaner box is located under a seat, the intake duct is located over the fuel tank in front of the seat, the intake port is located behind a head pipe, and the duct opening is located closer to a front end of the seat than the intake port.

12. The air intake system for the saddle-ride vehicle according to claim 1, wherein a front wall portion of the air cleaner box serves as a front case opening.

13. The air intake system for the saddle-ride vehicle according to claim 2, wherein a front wall portion of the air cleaner box serves as a front case opening.

14. The air intake system for the saddle-ride vehicle according to claim 1, wherein the case openings in the left and right side walls and the rear wall of the air cleaner box have ribs erected from rims respectively.

15. The air intake system for the saddle-ride vehicle according to claim 2, wherein the case openings in the left and right side walls and the rear wall of the air cleaner box have ribs erected from rims respectively.

16. An air intake system for a saddle-ride vehicle comprising:

an air cleaner box for positioning an air cleaner element housed in an air cleaner case;

an intake duct with a proximal end being connected to the air cleaner box;

an intake port formed on a distal end of the intake duct, said intake port being open toward a vehicle front side;

at least one duct opening formed in said intake duct, said at least one duct opening being oriented outward of the intake duct between the intake port and the air cleaner box; and a connecting tube operatively connected to the air cleaner box, said air cleaner box including case openings oriented outward of the case.

17. The air intake system for the saddle-ride vehicle according to claim 16, wherein the at least one duct opening is louver shaped with a guide plate inclined inward of the intake duct and is oriented perpendicularly to a flow of flow of air along the guide plate.

18. The air intake system for the saddle-ride vehicle according to claim 16, wherein the intake duct is connected to an upper or lower portion of the air cleaner box and the case openings of the air cleaner box are located in an upper or lower portion of the air cleaner box according to a place where the intake duct is connected.

19. The air intake system for the saddle-ride vehicle according to claim 16, wherein the case openings of the air cleaner box are made in left and right side walls and a rear wall of the air cleaner box and the case openings in the left and right side walls are located in a position biased toward a rear side of the air cleaner box.

20. The air intake system for the saddle-ride vehicle according to claim 16, wherein the air cleaner box is located under a seat, the intake duct is located over the fuel tank in front of the seat, the intake port is located behind a head pipe, and the duct opening is located closer to a front end of the seat than the intake port.

* * * * *